(12) United States Patent
Kwon et al.

(10) Patent No.: US 7,007,549 B2
(45) Date of Patent: Mar. 7, 2006

(54) AC TYPE FLOWMETER AND METHOD OF MAPPING FLOW RATE DATA FOR THE SAME

(75) Inventors: Ohmyoung Kwon, Seoul (KR); Joon Sik Lee, Seoul (KR); Young Ki Choi, Seoul (KR); Seungho Park, Seoul (KR); Won Seok Chung, Seoul (KR)

(73) Assignee: Seoul National University Industry Foundation, Seoul (KR)

( * ) Notice: Subject to any disclaimer, the term of this patent is extended or adjusted under 35 U.S.C. 154(b) by 1 day.

(21) Appl. No.: 10/758,780

(22) Filed: Jan. 15, 2004

(65) Prior Publication Data
US 2005/0044950 A1    Mar. 3, 2005

(30) Foreign Application Priority Data
Aug. 28, 2003 (KR) ............. 10-2003-0060009

(51) Int. Cl.
G01F 1/68 (2006.01)
(52) U.S. Cl. ................................. 73/204.14
(58) Field of Classification Search ............ 73/204.14, 73/202.5, 204.11, 204.15, 204.16, 204.25
See application file for complete search history.

(56) References Cited

U.S. PATENT DOCUMENTS 6,079,253 A * 6/2000 Bonne et al. ............... 73/61.76
6,223,593 B1 * 5/2001 Kubisiak et al. .......... 73/204.15

OTHER PUBLICATIONS

David G. Cahill, "Thermal Conductivity Measurement From 30 to 750K: The 3ω Method", Rev. Sci. Instrum. 61 (2), Feb. 1990, pp. 802-808, 1990 American Institute of Physics, New York.
M. Ashauer, H. Glosch, F. Hedrich, N. Hey, H. Sandmaier, W. Lang, "Thermal Flow Sensor for Liquids and Gases Based On Combinations of Two Principles", Sensors and Actuators 73 (1999), 1998, pp. 7-13, Elsevier Science S.A., Germany.
Gerlinde Bedö, Heike Fannasch, Rudolf Müller, "A Silicon Flow Sensor For Gases and Liquids Using AC Measurements", Sensors and Actuators 85 (2000), 1999, pp. 124-132, Elsever Science S.A., Germany.

* cited by examiner

*Primary Examiner*—Edward Lefkowitz
*Assistant Examiner*—Corey D. Mack
(74) *Attorney, Agent, or Firm*—The Webb Law Firm

(57) ABSTRACT

The present invention relates to a flowmeter suitable for a micro flow sensor. The flowmeter of the present invention comprises a resistive heater to be inserted into a fluid, AC power with a first frequency supplied to the resistive heater to periodically heat the resistive heater, a signal processing unit for detecting a first signal from the resistive heater in relation to a temperature variation of the resistive heater by the AC power, and obtaining a phase lag of the first signal relative to the heat generation in the resistive heater, and an operation unit for calculating a flow rate based on the obtained phage lag. According to the present invention, the flowmeter of the present invention has a wide measurement range and high measurement accuracy with a simple structure.

9 Claims, 11 Drawing Sheets

AC TYPE FLOWMETER AND METHOD OF MAPPING FLOW RATE DATA FOR THE SAME

BACKGROUND OF THE INVENTION

1. Field of the Invention

The present invention relates, in general, to an apparatus for measuring the flow rate of a fluid and, more particularly, to a flowmeter suitable for a micro flow sensor.

2. Description of the Related Art

Generally, the accurate measurement of a flow rate in microfluidic systems is very important in various applications, such as chemical component analyzing processes, the administration of medicine, and semiconductor fabrication processes. Micro flow sensors should have very simple structures because they should be installed in a very limited space and be easy to be integrated into microfabrication process of the microfluidic systems. Further, the micro flow sensors should have extremely high measurement accuracy because a flow rate in a micro channel is lower than that in a macro-scale channel. In the last 20 years, various micro flow sensors have been developed using micromachining technology. However, it is difficult to find a sensor simultaneously satisfying the above requirements.

Conventional flow sensors can be classified into mechanical flow sensors (or non-thermal flow sensors) and thermal flow sensors according to the working principles thereof. The mechanical flow sensors measure a flow rate using a pressure drop, a drag force, Coriolis force, etc., which are generated by a flow. The mechanical flow sensors are advantageous in that energy consumption is low and fluid is not heated, while the mechanical flow sensors are problematic in that they are difficult to be integrated into a whole microfluidic system together with a micro valve, pump or the like due to the complex structures thereof. On the contrary, the thermal flow sensors have simple structures and simple electrical characteristics, so that they are preferred to the mechanical flow sensors in microfluidic systems.

The thermal flow sensors measure a flow rate using heat transfer between a heater and a fluid. In this case, conventional thermal flow sensors can be classified into hotwire/film type sensors for measuring the variation of heating power supplied to a sensor or temperature of the sensor, calorimetric type sensors for measuring the asymmetry of temperature profile around the heater, and time-of-flight type sensors for measuring the time required for a heat pulse to travel a certain distance.

In addition to the above-described structural simplicity, the thermal flow sensors have the following advantages. That is, in the case of the hotwire/film type sensors, the response time of the sensor is short, the sensitivity thereof is excellent. Further, in the case of the calorimetric type sensors, since sensors are symmetrically placed in the downstream and the upstream of the heater, a flow direction can be detected.

However, the thermal type flow sensors have the following problems. That is, because the heater must be maintained at a high temperature so as to improve measurement accuracy, fluid around the sensors may be significantly heated. Further, because of the susceptibility of the sensors to the temperature variations of the fluid and the surroundings, the temperature of the fluid must be precisely controlled or the temperature variations must be compensated for. Further, the calorimetric type sensors are limited in a measurement range, and the time-of-flight type sensors are not suitable for the measurement of low speed flow due to heat diffusion.

There have been a lot of efforts to overcome these problems. For example, the heaters were pulsed at a fixed current level in order to avoid thermal drift and the effect of ambient temperature was compensated by inserting resistors into the measurement circuit. To extend the flow measuring range, a thin layer as a heat sink and flow guide was integrated on the backside of sensor or different measurement methods were applied according to the range of flow speed. As the result of the above research and efforts, the disadvantages of the conventional sensors are complemented to some degree, but the structures of the sensors or the measurement circuits become inevitably complicated.

In the meantime, Bedö et al. have proposed a scheme for measuring a flow rate by operating a heater using Alternating Current (AC) power and by measuring a signal using sensors placed on both the upstream and downstream of the heater in a paper entitled "A silicon flow sensor for gases and liquids using AC measurements," (Sensors and Actuators, Vol. 85, pp. 124–132). This scheme is advantageous in that the response of the sensor to the change of the flow rate becomes faster, and the susceptibility to the surrounding fluid temperature is reduced. However, the above scheme is problematic in that, since the sensor and the heater are separate, heat diffusion and the decay of thermal waves occur while the thermal waves propagate from the heater to the sensor across a flow, so that the sensor must be heated at a very high temperature.

SUMMARY OF THE INVENTION

Accordingly, the present invention has been made keeping in mind the above problems occurring in the prior art, and an object of the present invention is to provide an AC type flowmeter, which has a wide measurement range and high measurement accuracy while having a simplified structure, and a method of mapping flow rate data for the flowmeter.

In order to accomplish the above object, the present invention provides a flowmeter, comprising a resistive heater to be inserted into a fluid, Alternating Current (AC) power with a first frequency for periodic heating of the resistive heater, a signal processing unit for detecting a first signal which is related to a temperature variation of the resistive heater by the AC power and obtaining a phase lag of the first signal relative to the heat generation in the resistive heater, and an operation unit for calculating a flow rate of the fluid based on the phage lag.

Preferably, the flowmeter may further comprises a first detecting unit for measuring a voltage signal from the resistive heater, wherein the signal processing unit may detect the first signal based on an output signal from the first detecting unit.

Preferably, the flowmeter may further comprises a variable resistor placed on a supply path of the AC power and set for the same resistance value as that of the resistive heater, and a second detecting unit for detecting a voltage signal from the variable resistor, wherein the signal processing unit may detect the first signal based on a signal obtained by subtracting an output signal of the second detecting unit from the output signal of the first detecting unit.

Preferably, the first signal may have a second frequency, which is two or three times as large as the first frequency of the AC power.

Preferably, the resistive heater may be embodied by a metallic or semiconductor element.

Preferably, the operation unit may comprise a memory unit for storing phase lag data between the first signal and the heat generation in the resistive heater and flow rate data corresponding to the phase lag data, which are mapped to each other, and a microprocessor for calculating the flow rate of the fluid based on a correspondence between the obtained phase lag data of the first signal and the data stored in the memory unit. Preferably, the microprocessor may control the frequency of the AC power.

Further, the present invention provides a method of mapping phase lags to flow rates, comprising the steps of a) providing a resistive heater in fluid moving at a predetermined flow rate, b) supplying AC power with a first frequency to the resistive heater, c) detecting a first signal which is related to a temperature variation of the resistive heater, d) obtaining a phase lag of the first signal relative to the heat generation in the resistive heater, e) measuring the flow rate of the fluid, f) varying the flow rate of the fluid and repeating the steps b) to e) several times, and g) mapping measured flow rates of the fluid to phase lags of the first signal.

Preferably, in the mapping method, the steps b) to g) may be repeatedly performed at many different frequencies. Preferably, the first signal detected through the mapping method of the present invention has a second frequency, which may be two or three times as large as the first frequency.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

Principle of Measuring Flow Rate According to the Present Invention

Figure 1A:
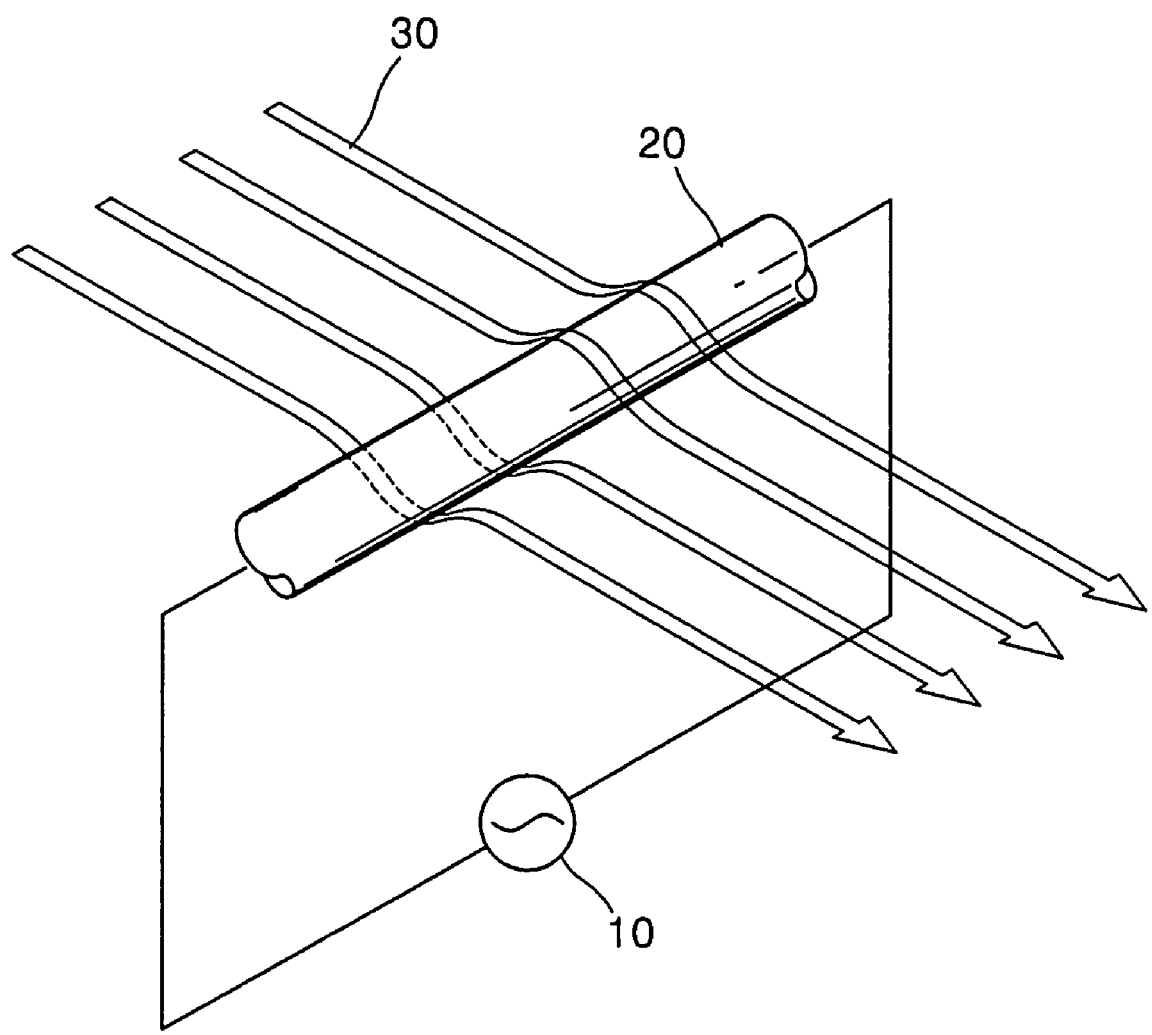
FIGS. 1A and 1B show the principle of the present invention.
Figure 1B:
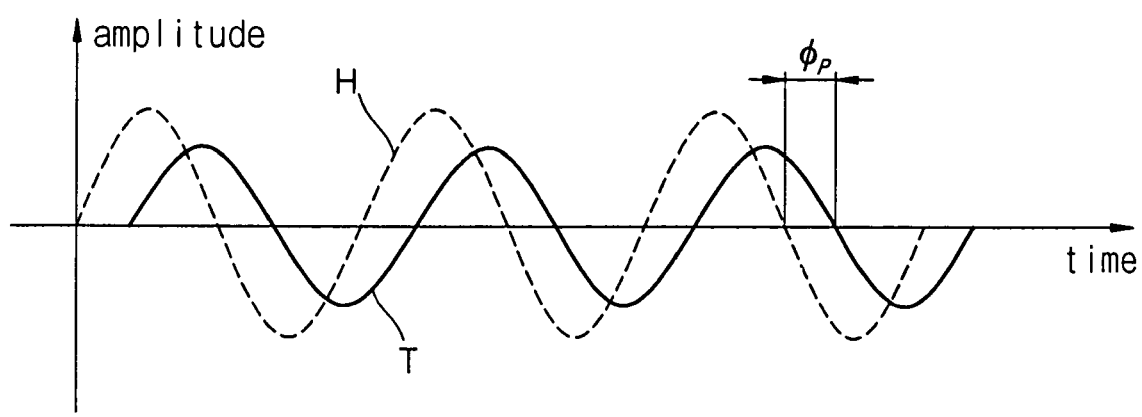

FIGS. 1A and 1B are schematic views showing the principle of measuring flow rate according to the present invention. As shown in FIG. 1A, when a resistive heater, such as a hotwire 20 supplied with AC power 10, is placed in a flow field 30, the hotwire 20 is periodically heated by AC power 10 supplied to the hotwire 20.

At this time, heat generation in the hotwire 20 shows a waveform H represented by a dotted line in FIG. 1B. The waveform H depends on the waveform of the supplied AC power 10. On the other hand, the temperature of the hotwire 20 oscillates with a certain phase lag $\phi_p$ relative to the periodic variation of heat generation. The waveform T expressed by a solid line of FIG. 1B represents the temperature variation of the hotwire 20. As shown in FIG. 1B, there is a phase lag between the periodic variation of the heat generation and the periodic variation of the hotwire temperature. This phase lag is a function of the convection heat transfer coefficient of the hotwire 20, which is closely related to the flow rate. Therefore, the phase lag varies as the flow rate.

The present inventors discovered that a one-to-one correspondence is satisfied between the phase lag $\phi_p$ and the flow rate. Accordingly, the present invention provides a flowmeter based on the correspondence of phase lags and flow rates previously mapped to each other.

Flowmeter of Present Invention

Figure 2:
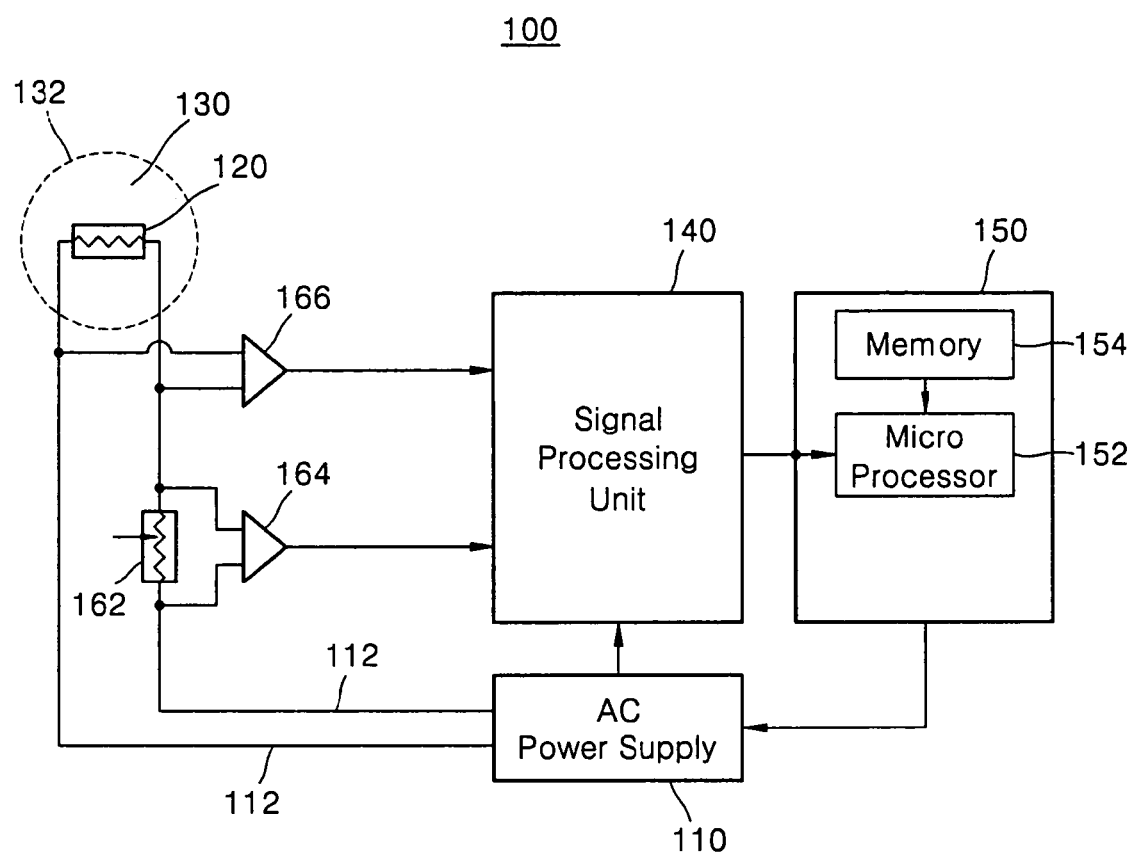
FIG. 2 is a schematic diagram of a flowmeter according to the present invention.

FIG. 2 is a schematic view showing the construction of a flowmeter 100 according to the present invention.

Referring to FIG. 2, the flowmeter 100 of the present invention comprises a resistive heater 120, an AC power supply 110, a first detecting unit, such as a differential amplifier 166, a signal processing unit 140 and an operation unit 150.

The resistive heater 120 is installed in a channel 132 through which fluid 130 flows. The resistive heater 120 is supplied with a certain voltage provided from the AC power supply 110.

Heat generation in the resistive heater 120 periodically oscillates at certain frequency depending on the frequency of the AC voltage provided from the AC power supply 110. In the present invention, any material, which can be heated because of its resistance when power is supplied, can be used as the resistive heater 120. For example, a metallic material such as tungsten, a semiconductor material such as doped polysilicon and a ceramic heater including graphite can be used as the resistive heater 120. The resistive heater 120 can be embodied in various shapes such as a wire or a film.

The signal processing unit 140 detects a signal related to the temperature variation of the resistive heater 120 and measures a phase lag of the signal.

In the present invention, the signal related to the temperature variation of the resistive heater 120 is detected by the first detecting unit, such as the differential amplifier 166 with input terminals connected to both ends of the resistive heater 120, and is inputted to the signal processing unit 140. The signal related to the temperature variation will be additionally described later.

In the meantime, the flowmeter 100 of the present invention may have an additional component to eliminate an AC power signal supplied to the resistive heater 120 from the signal generated in the resistive heater 120. For this purpose, as shown in FIG. 2, the flowmeter 100 of the present invention may have an additional resistor 162 arranged on a supply path 112 of the AC power supply 110, and a second detecting unit, such as a differential amplifier 164 with input terminals connected to both ends of the resistor 162. In this construction, the resistor 162 must be capable of being set to have the same resistance value as that of the resistive heater 120. Therefore, it is desirable that a variable resistor is used for the resistor 162. When the resistance values of both the resistive heater 120 and the resistor 162 are identically set, a voltage signal applied to the resistor 162 by the AC power supply 110 becomes identical to a voltage signal applied to the resistive heater 120 by the AC power supply 110. Therefore, by subtracting an output signal of the second detecting unit 164 from that of the first detecting unit 166, the voltage signal component by the AC power supply 110 in the output of the first detecting unit 166 can be eliminated.

From output signal of the first detecting unit 166, the signal processing unit 140 measures a phase lag of the signal related to the temperature variation of the resistive heater 120 on the basis of the AC power signal applied to the resistive heater 120. At this time, the output signal of the second detecting unit 164 is subtracted from the output signal of the first detecting unit 166 in order to detect the signal related to the temperature variation of the resistive heater 120 more accurately as described above. The signal processing unit 140 can be embodied by a device such as a typical lock-in amplifier which is capable of measuring the amplitude and phase of a specific signal of input signals. The construction of the lock-in amplifier is apparent to those skilled in the art, so a detailed description thereof is omitted.

The signal related to the temperature variation detected by the signal processing unit 140 has the same phase lag as that of the temperature variation of the resistive heater 120 relative to the heat generation in the resistive heater 120, or a phase lag reflecting that of the temperature variation. The temperature variation-related signal may have a frequency, which is two or three times ($2\omega$ or $3\omega$) as large as the frequency ($\omega$) of the AC power. The frequency of the signal will be described in detail later.

The operation unit 150 may include a microprocessor 152 and a memory 154. The operation unit 150 calculates a flow rate on the basis of the phase lag measured by the signal processing unit 140.

The memory 154 stores therein sets of phase lag data and flow rate data, which are mapped to each other, so as to allow the microprocessor 152 to refer to the sets for calculating the flow rate. The microprocessor 152 calculates a flow rate corresponding to the measured phase lag by the signal processing unit 140 on the basis of the correspondence of the phase lags and flow rates stored in the memory 154.

The operation unit 150 can control the frequency and voltage of the AC power supplied to the resistive heater 120 by controlling the microprocessor 152. It is possible to measure the phase lag more accurately through this control by supplying AC power with an optimal frequency for a flow rate to be measured, which will be described later.

Signals Related to the Phase of Temperature Variation of the Resistive Heater

As previously described, the waveform of the temperature variation of the resistive heater has a certain phase lag relative to heat generation and the phase lag can be measured from the signal related to the temperature variation. Hereinafter, signals related to the temperature variation of the resistive heater are described in detail.

Figure 3:
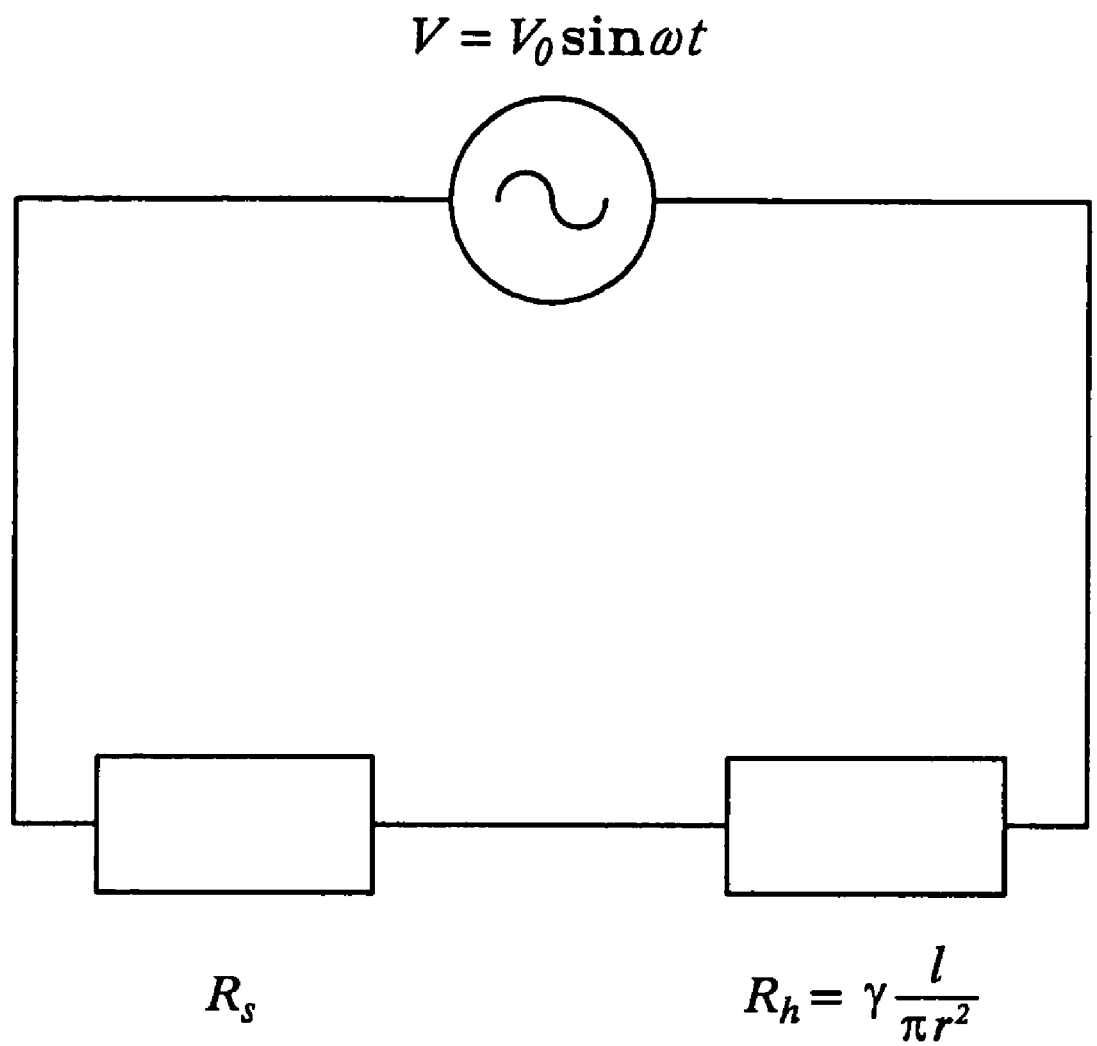
FIG. 3 is a simplified circuitry for qualitatively showing signals with a phase lag generated in a resistive heater, in which the resistive heater is connected to AC power with a frequency of $\omega$.

A circuit comprising a resistive heater $R_h$ connected to AC power with a frequency of $\omega$ can be simplified as shown in FIG. 3. In this case, $R_s$ represents additional resistor in the circuit.

If the resistance value of the resistive heater $R_h$ becomes much smaller than that of the additional resistor $R_h$, the temperature change in the resistive heater $R_h$ has a negligible effect on current flowing the circuit and it is reasonable to assume that the current has constant value. Thus the current is given by the following Equation [1].

$$I = \frac{V_0}{R_s + R_h} \sin \omega t \approx I_0 \sin \omega t \quad (R_s \gg R_h) \qquad [1]$$

Therefore, heat generation per unit volume generated due to the resistance of the resistive heater with a radius r can be expressed by the following Equation [2], $$\dot{q} = \frac{I_0^2 \gamma}{2\pi^2 r^4} \cdot \left[1 + \sin\left(2\omega t - \frac{\pi}{2}\right)\right] \qquad [2]$$

where $\gamma$ is the resistivity of the resistive heater. It can be seen from Equation [2] that the heat generation oscillates at the frequency of $2\omega$.

In the meantime, if the diameter of the resistive heater is very small, the following energy conservation equation is satisfied because it can be assumed that the temperature of the resistive heater is spatially uniform, $$\rho c_p \pi r^2 \frac{\partial \theta}{\partial t} = \pi r^2 \dot{q} - h 2\pi r \theta \qquad [3]$$

where $\rho$ is the density of the resistive heater, $c_p$ is the specific heat of the resistive heater, h is the convective heat transfer coefficient, and $\theta$ is the temperature difference between the resistive heater and the surrounding fluid. The solution of the above Equation [3] can be expressed by the following Equation [4], $$\theta = Ce^{-\frac{2h}{\rho c_p r}t} + \frac{\dot{q}_0 r}{2h} + \frac{r \dot{q}_0}{2\sqrt{h^2 + (\rho c_p r \omega)^2}} \sin\left(2\omega t - \frac{\pi}{2} + \phi\right) \qquad [4]$$

where C is constant of integration, which can be obtained from an initial temperature condition of the resistive heater. A first term on the right-hand side of Equation [4] is the decaying component that disappears as time passes, a second term is the steady DC component having a constant value regardless of the time variation, and a third term is the periodic AC component of the temperature which oscillates with the elapse of time and has a phase lag $\phi$ relative to the heat generation of the resistive heater. This phase lag $\phi$ is given by the Equation [5], $$\tan \phi = -\frac{\rho c_p r \omega}{h} \qquad [5]$$

From Equation [5], it can be seen that the phase lag is a function of the frequency of the AC power and the convective heat transfer coefficient of the resistive heater.

Since the electric resistance of a conductor is a function of temperature in general, the resistance of the resistive heater oscillates with the same frequency and phase as those of the temperature. Thus, an AC voltage oscillating at the frequency of 3ω is generated in the resistive heater due to the current supplied to the resistive heater at the frequency of ω and the resistance of the resistive heater varying at the frequency of 2ω. The AC voltage can be expressed by the following Equation [6].

$$V_{3\omega} = \frac{I_0 R_{h,b} \alpha \theta_{AC,0}}{2} \sin(3\omega t - \pi + \phi) \quad [6]$$

From Equation [6], it can be seen that the voltage signal with the frequency of 3ω (3ω voltage) and the phase lag of φ is generated in the resistive heater.

From Equation [6], the amplitude of the resistive heater temperature $\theta_{AC,0}$ can be evaluated from the amplitude of current $I_0$, the resistance of the resistive heater at normal temperature $R_{h,b}$, the temperature coefficient of the resistive heater resistance α, and the 3ω voltage.

Through the above-described steady periodic electrothermal analysis, when an AC voltage with a frequency of ω is applied, the frequencies, the amplitudes and the phase lags of current, heat generation, temperature and 3ω voltage can be obtained and summarized in the following Table 1.

A fluid 271 stored in a reservoir 270 flows into a channel, such as a polyurethane tube 230, at a certain flow rate and the mass of the gathered fluid during a fixed time interval is measured by a measuring device, such as a scale 260 placed at one end of the tube, so that the flow rate of the fluid is measured. The fluid 271 is supplied to the polyurethane tube 230 by compressed air supplied to an inlet 274 of the reservoir 270. The flow rate of the fluid can be controlled by regulating the flow rate of the compressed air using the metering valve 272.

Figure 4A:
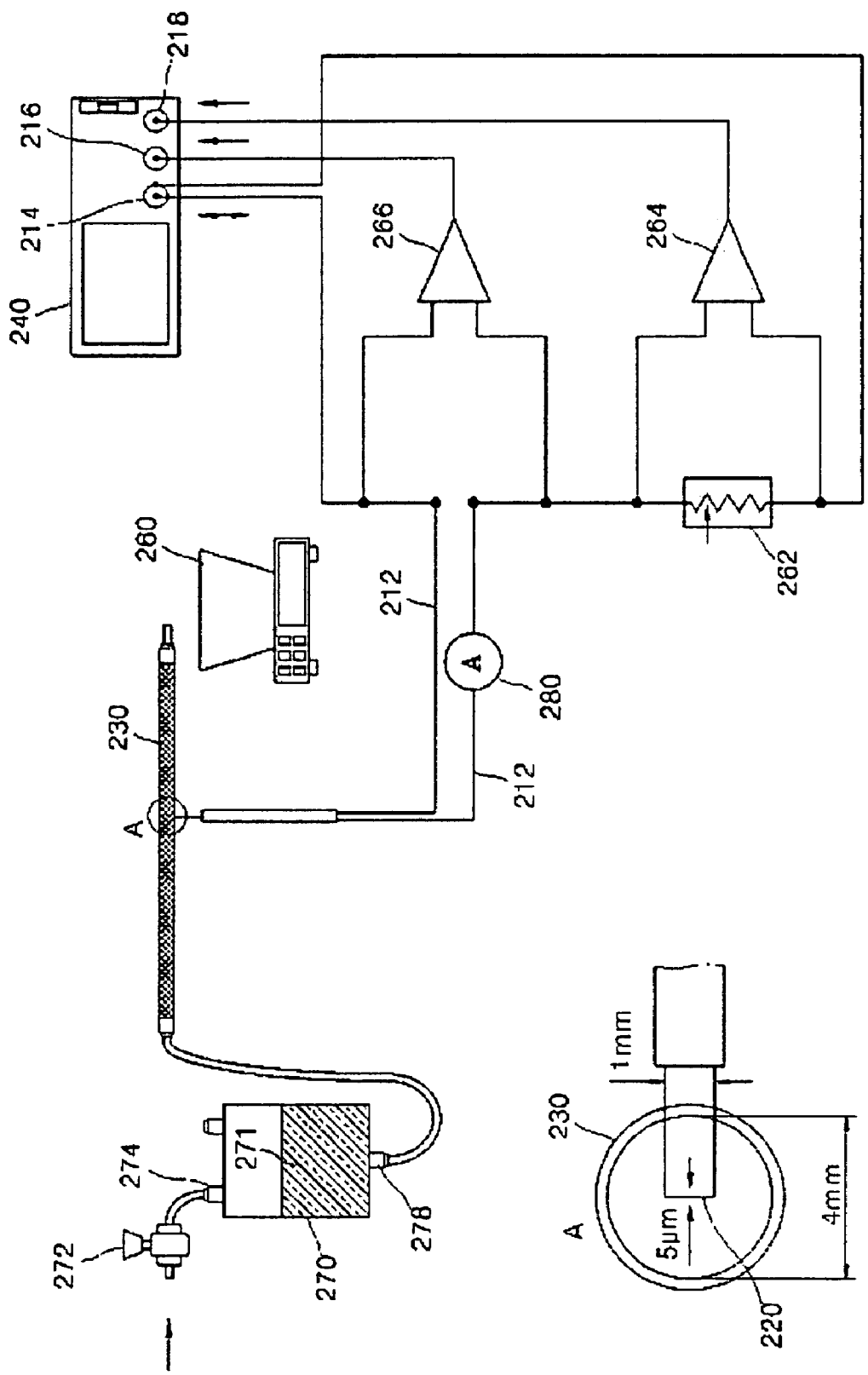
FIGS. 4A and 4B are a schematic view of apparatus for mapping phase lags to flow rates according to the present invention and a flowchart of a method for mapping phase lags to flow rates using the apparatus of FIG. 4A, respectively.

In the polyurethane tube 230, a tungsten hotwire 220 is installed as a sensor for measuring a flow rate. A lower-left portion of FIG. 4A illustrates an enlarged cross-section of a part "A" in which the hotwire 220 is installed. As shown in FIG. 4A, the tube 230 has an inner diameter of 4 mm, and the hotwire 220 has a diameter of 5 μm, and a length of 1 mm.

Referring to FIG. 4A, conducting wires 212 are connected to both ends of the hotwire 220 in order to supply AC power with a frequency of ω through a power output terminal 214 of a lock-in amplifier 240. The lock-in amplifier 240 receives signals from the hotwire 220 through signal input channels 216 and 218, and evaluates the amplitude and phase of the received signal related to the temperature variation of the hotwire 220, for example 3ω voltage signal.

TABLE 1

| Item | Frequency | Amplitude | | Phase lag |
|---|---|---|---|---|
| Power voltage | ω | $V_0$ | | 0 |
| Current | ω | $\frac{I_0^3 \alpha \gamma_0 \gamma 1}{8\pi^3 r^5 \sqrt{h^2 + (\rho c_p r \omega)^2}} = \left(\frac{I_0 R_{h,b} \alpha}{2}\right) \theta_{AC,0}$ | | 0 |
| Heat generation per unit volume | 2ω | $\frac{I_0^3 \alpha \gamma_0 \gamma 1}{8\pi^3 r^5 \sqrt{h^2 + (\rho c_p r \omega)^2}} = \left(\frac{I_0 R_{h,b} \alpha}{2}\right) \theta_{AC,0}$ | $\frac{I_0^3 \alpha \gamma_0 \gamma 1}{8\pi^3 r^5 \sqrt{h^2 + (\rho c_p r \omega)^2}} = \left(\frac{I_0 R_{h,b} \alpha}{2}\right) \theta_{AC,0}$ | |
| AC component of temperature | 2ω | $\frac{I_0^3 \alpha \gamma_0 \gamma 1}{8\pi^3 r^5 \sqrt{h^2 + (\rho c_p r \omega)^2}} = \left(\frac{I_0 R_{h,b} \alpha}{2}\right) \theta_{AC,0}$ | $\frac{I_0^3 \alpha \gamma_0 \gamma 1}{8\pi^3 r^5 \sqrt{h^2 + (\rho c_p r \omega)^2}} = \left(\frac{I_0 R_{h,b} \alpha}{2}\right) \theta_{AC,0}$ | |
| 3ω voltage | 3ω | $\frac{I_0^3 \alpha \gamma_0 \gamma 1}{8\pi^3 r^5 \sqrt{h^2 + (\rho c_p r \omega)^2}} = \left(\frac{I_0 R_{h,b} \alpha}{2}\right) \theta_{AC,0}$ | | Φ − π |

As described above, when AC power is applied to the resistive heater, both the AC component of temperature with a frequency of 2ω and the 3ω voltage have certain phase lags relative to the heat generation, respectively. Therefore, it is possible to detect the phase lag by measuring the signal related to the AC component of temperature or the 3ω voltage.

Properly, the signals shown in the above Equations are only examples of the measurable signals in the present invention. Therefore, any signals involving the phase lag in the resistive heater temperature can be targets to be measured, in accordance with the technical spirit of the present invention.

Flow Rate Mapping Method

FIG. 4A is a schematic view showing an experimental apparatus for mapping phase lag data to flow rate data for the flowmeter in the present invention.

For this evaluation, a differential amplifier 266 which is connected in parallel to both ends of the hotwire 220 is connected to the conducting wires 212 so as to receive the signals generated in the hotwire 220. Further, a variable resistor 262 adjusted to have the same resistance value as that of the hotwire 220 and a differential amplifier 264 connected in parallel to both ends of the variable resistor 262 are connected to the conducting wires 212 so as to eliminate signals of the AC power from the signals generated in the hotwire 220.

The lock-in amplifier 240 receives output signals from the differential amplifiers 266 and 264 through the input signal channels 216 and 218, subtracts the output signal of the differential amplifier 264 from the output signal of the differential amplifier 266, and measures the amplitude and phase of required signal. Through the subtraction operation, a supplied power signal with a frequency of ω and noise signal contained in the supplied power signal can be simultaneously eliminated. The construction and the operation of the lock-in amplifier performing the above function are apparent to those skilled in the art, so a detailed description thereof is omitted.

In the meantime, an ammeter 280 is further provided in the experimental apparatus to measure the amount of current flowing through the conducting wires 212. The ammeter 280 measures the amplitude of the AC current flowing through the hotwire 220 and the measured amplitude is used for obtaining the amplitude of the AC component of temperature.

Figure 4B:
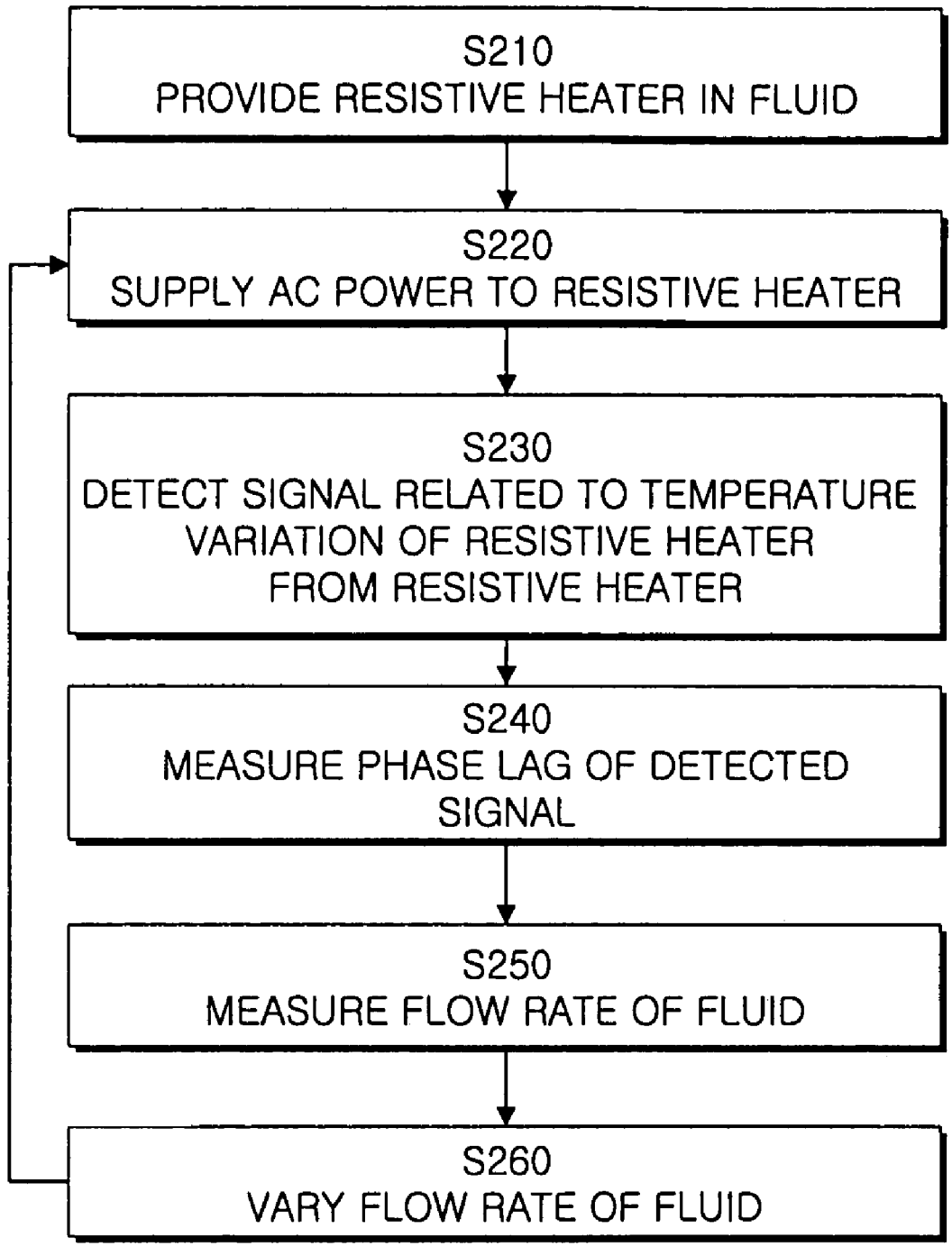

Hereinafter, a mapping process in the present invention is described with reference to FIG. 4B.

First, the resistive heater is installed within the channel through which the fluid flows at step S210, and the fluid to be measured is allowed to pass through the channel at a certain flow rate. Then, AC power with a certain frequency is supplied to the resistive heater at step S220. The resistive heater is heated by the supplied AC power. After the flow is stabilized, a signal related to the temperature variation of the resistive heater, for example, a 3ω voltage signal, is detected at step S230. As described above, the signal related to the temperature variation of the resistive heater has a certain phase lag relative to heat generation in the resistive heater. Using the signal processing unit, such as the lock-in amplifier 240, the phase lag of the signal related to the temperature variation of the resistive heater can be measured at step S240. Then, the mass of the fluid passing through the channel during a fixed time interval is measured using the scale and the flow rate of the fluid is measured at step S250. Through steps S220 to S250, a phase lag value can be matched with a flow rate value. The phase lag values and flow rates can be mapped to each other by repeatedly performing the above steps S220 to S250 while varying the flow rate of the fluid at step S260.

According to the present invention, the variation of the phase lags according to flow rates depends on the frequency of the supplied AC power. Therefore, an operation of mapping phase lags to flow rates can be performed at various frequencies.

Phase lag-flow rate data, obtained through mapping operation at various frequencies, is advantageous in that it is possible to measure the flow rate more accurately by selecting a frequency with highest measurement sensitivity at that flow rate.

Experimental Example for Flow Rate Mapping

Figure 5:
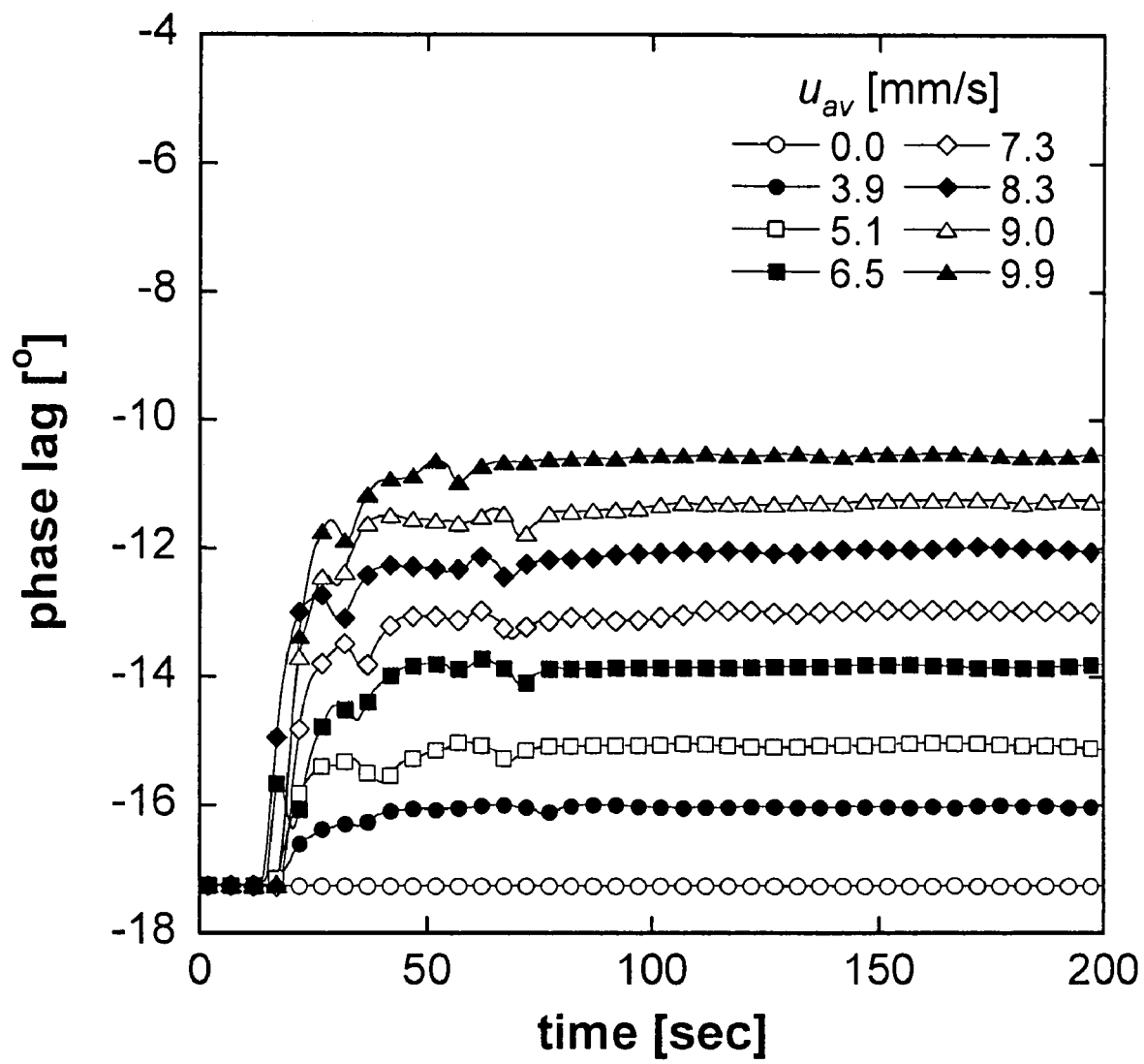
FIG. 5 shows the phase lag variation of a $3\omega$ voltage signal measured with the elapse of time using the apparatus of FIG. 4A.

FIG. 5 is a graph showing the phase lag variation of a 3ω voltage signal measured with the elapse of time using the experimental apparatus of FIG. 4A. In this experiment, phase lags measured from a signal with a frequency three times as large as that of the supplied AC voltage (that is, φ of Table 1). The range of measured average flow speeds is 0.0 mm/s to 9.9 mm/s. The frequency of the AC power is 10 Hz, and an AC voltage applied to the hotwire is 135 mV. Further, the amplitude of the AC component of temperature $\theta_{AC,0}$ evaluated using a current value measured by the ammeter and Equation [6] is approximately 3° C. at an average flow speed of 0.0 mm/s.

As shown in FIG. 5, phase lags at each average flow speed increase initially, and converge to a certain value after a certain time has passed.

Further, FIG. 5 shows that all phase lags have different values at each average flow speed after stabilization. From this, it can be seen that the phase lags and the flow rates have one-to-one correspondences and the flow rate can be obtained by measuring the phase lag.

In the meantime, it can be observed that a phase lag increases by about 1.3° when an average flow speed $u_{av}$ increases from 0.0 mm/s to 3.9 mm/s, while the phase lag increases by about 4° when the average flow speed $u_{av}$ increases from 3.9 mm/s to 8.3 mm/s. Therefore, the phase lag is not linearly proportional to the flow rate.

Hereinafter, the variation of the phase lag versus the variation of frequency is described referring to FIGS. 6A and 6B and FIGS. 7A and 7B.

Figure 6A:
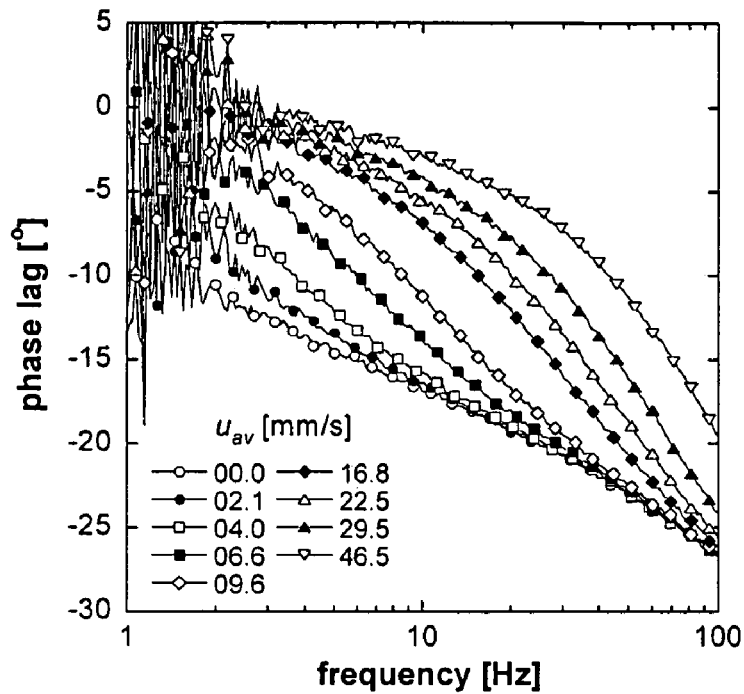
FIG. 6A shows the phase lag variation of the $3\omega$ voltage signal versus frequency variation of AC power.

FIG. 6A is a graph showing the phase lag variation of the 3ω voltage signal versus the frequency variation in a frequency region from 1 Hz to 100 Hz. The range of average flow speed in this experiment is from 0.0 mm/s to 50.0 mm/s. The voltage of AC power applied to the hotwire is about 77 mV, and the evaluated amplitude of the AC component of the temperature $\theta_{AC,0}$ is within a range from 0.6 to 1.3° C. according to frequencies at the average flow speed of 0.0 mm/s.

FIG. 6A shows that an optimal frequency region for the highest measurement sensitivity depends on the range of average flow speed. Referring to FIG. 6A, in a low speed range from 0.0 to 9.6 mm/s, the phase lag variation according to the increase of flow speed increases in a low frequency region. However, in a high speed range from 16.8 to 46.5 mm/s, the phase lag variation according to the increase of flow speed increases in a high frequency region. Therefore, it is possible to measure a very wide range of flow rate with high measurement accuracy by frequency tuning in the present invention.

Figure 6B:
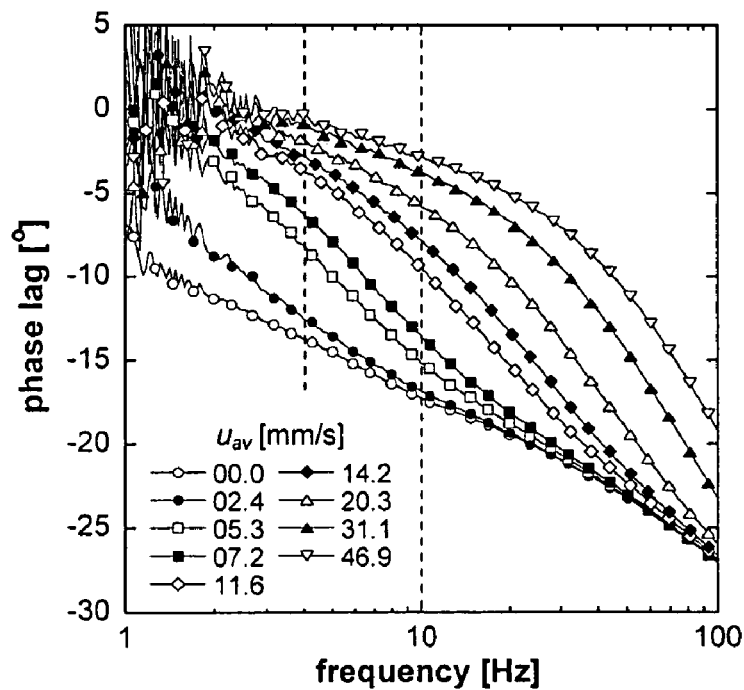
FIG. 6B shows the phase lag variation versus frequency variation measured under the similar flow rate condition to that of FIG. 6A after the voltage of the AC power is set differently from that of FIG. 6A.

FIG. 6B is a graph showing the phase lag variation versus the frequency variation measured under the similar flow speed condition as that of FIG. 6A when the voltage of AC power is set differently from that of FIG. 6A. In this experiment, the voltage of the AC power applied to the hotwire about 135 mV, and the evaluated amplitude of the AC component of the temperature $\theta_{AC,0}$ is within a range from 2.0 to 4.0° C. according to frequencies at the average flow speed of 0.0 mm/s.

Referring to FIG. 6B, it can be seen that, although the voltage of the supplied AC power differs from that of FIG. 6A, the phase lag variation versus the frequency variation exhibits the same tendency as in the graph of FIG. 6A. That is, in the present experiment, the phase lag has almost the same value under the same frequency and flow rate condition independent of hotwire temperature and the measurement sensitivity does not depend on the temperature or heat generation of the hotwire because the flow rate measuring technique of the present invention measures the phase lag in a frequency domain. Therefore, the flowmeter applying the present invention is suitable for the measurement in a flow field with temperature variations. Further, as described above experiments, the amplitudes of the AC component of the hotwire temperature are several degrees Celsius or less, so that there is no probability that the hotwire heats a surrounding fluid because the hotwire temperature is very low.

Figure 7A:
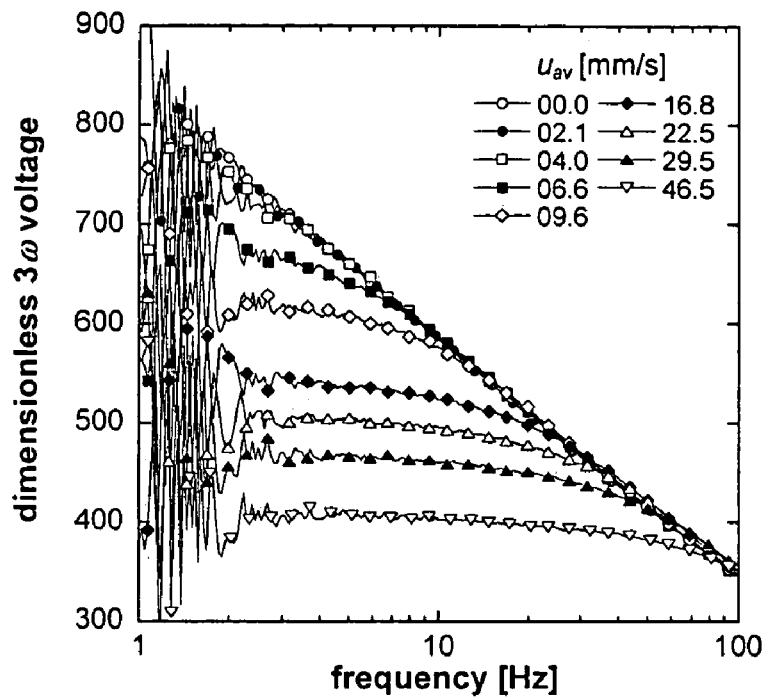
FIGS. 7A and 7B show the amplitude of a dimensionless $3\omega$ voltage signal measured under the same conditions as those of FIGS. 6A and 6B, respectively.
Figure 7B:
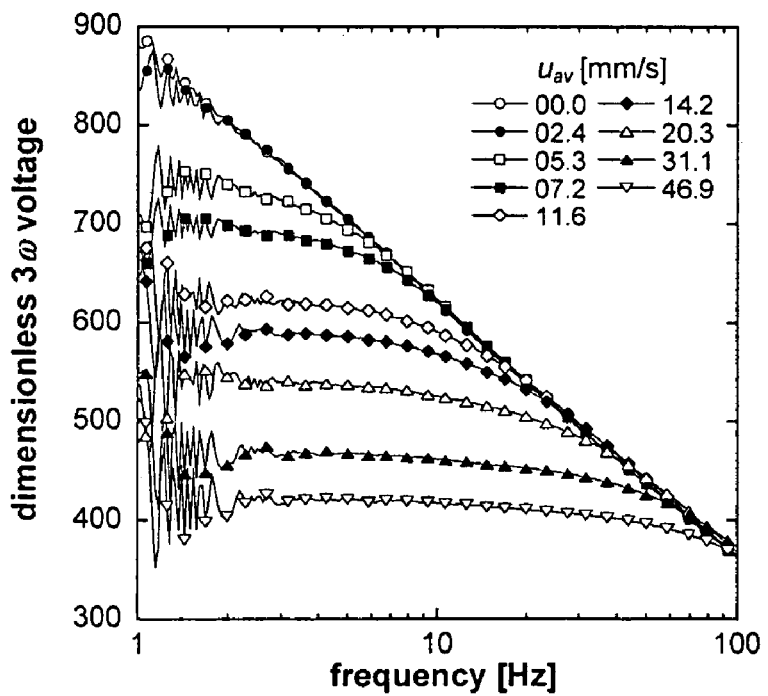

In the meantime, FIGS. 7A and 7B are graphs showing the variation of 3ω voltage amplitude measured under the same conditions as those of FIGS. 6A and 6B, respectively. In these graphs, y-axis represents a amplitude of dimensionless 3ω voltage $V^*_{3\omega,0}$ obtained by the following Equation [7].

$$V^*_{3\omega,0} = \frac{V_{3\omega,0}}{V_c} = \frac{V_{3\omega,0}}{I_0 R_c} = \frac{V_{3\omega,0}}{I_0 R_{h,b} \alpha T_c} \quad [7]$$

$$= \frac{V_{3\omega,0}}{I_0 R_{h,b} \alpha \cdot \frac{\dot{q}_0}{k/r^2}} = \frac{2\pi^2 k r^2}{R_{h,b} \alpha \gamma} \cdot \frac{V_{3\omega,0}}{I_0^3}$$

If FIGS. 7A and 7B are compared to each other, it can be seen that the amplitudes of dimensionless 3ω voltage have almost the same values regardless of the voltage applied to the hotwire. Further, referring to the two graphs, in a low frequency region, the amplitude of the dimensionless 3ω voltage rapidly decreases with increasing flow rates, while, in a high frequency region, the amplitudes of the dimensionless 3ω voltage become almost uniform regardless of the variation of flow speeds.

Figure 8A:
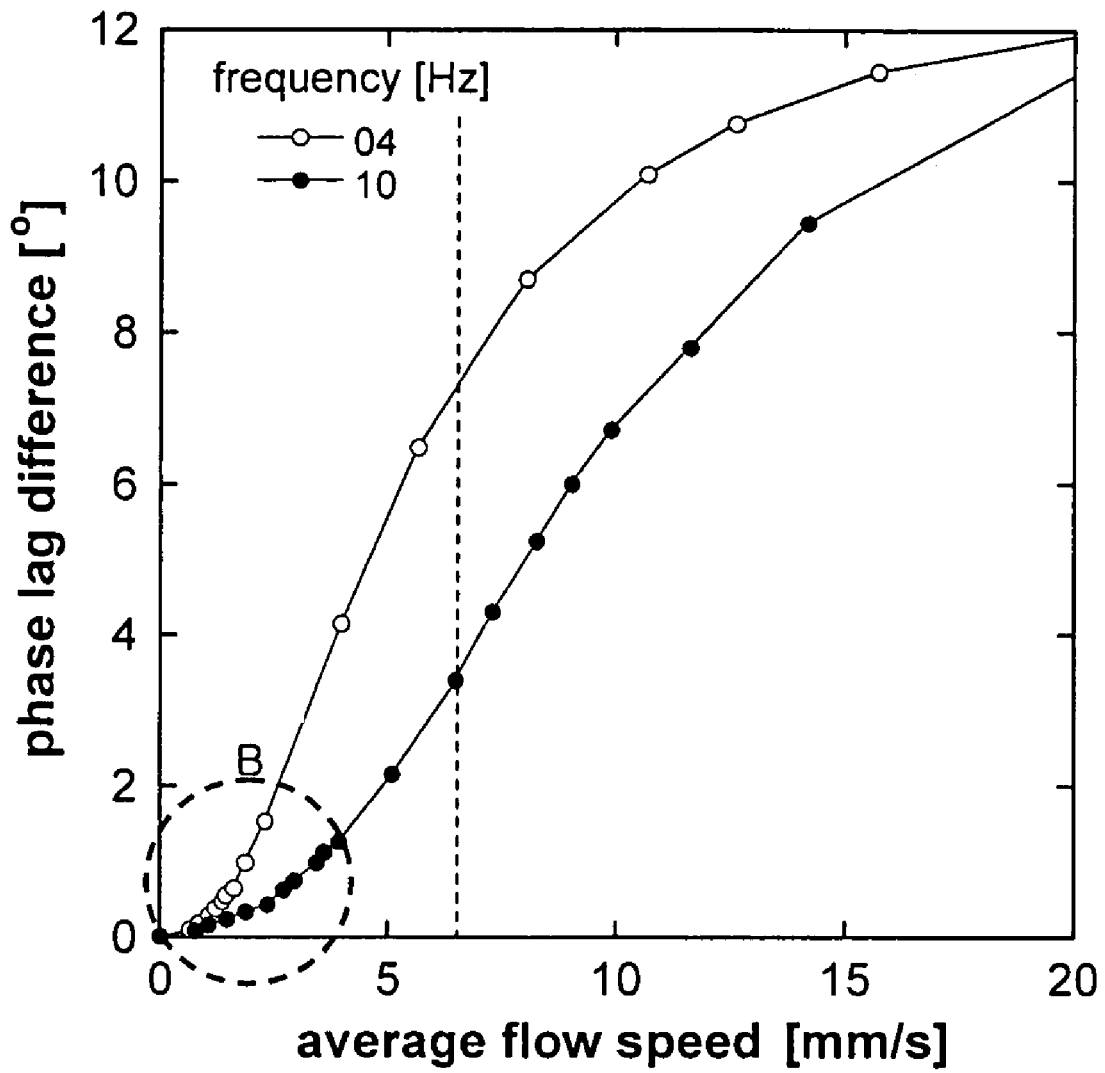
FIG. 8A shows the phase lags and average flow rates which are mapped to each other along dotted lines of FIG. 6B.

FIG. 8A is a graph in which phase lags and average flow speeds are mapped to each other at the frequencies of 4 Hz ($\theta_{AC,0}$=3.6° C.) and 10 Hz ($\theta_{AC,0}$=3.0° C.) represented by dotted lines of FIG. 6B. In this graph, y-axis represents a difference between phase lag at each flow speed and phase lag at an average flow speed of 0.0 mm/s. Considering the slope of phase lag—average flow speed curve can be regarded as the measurement sensitivity, the measurement sensitivity at the frequency of 4 Hz is better than that at the frequency of 10 Hz in the average flow speed range from 0.0 to 5.0 mm/s, while the measurement sensitivity at the frequency of 10 Hz is better than that at the frequency of 4 Hz in the average flow speed range over 7 mm/s.

Figure 8B:
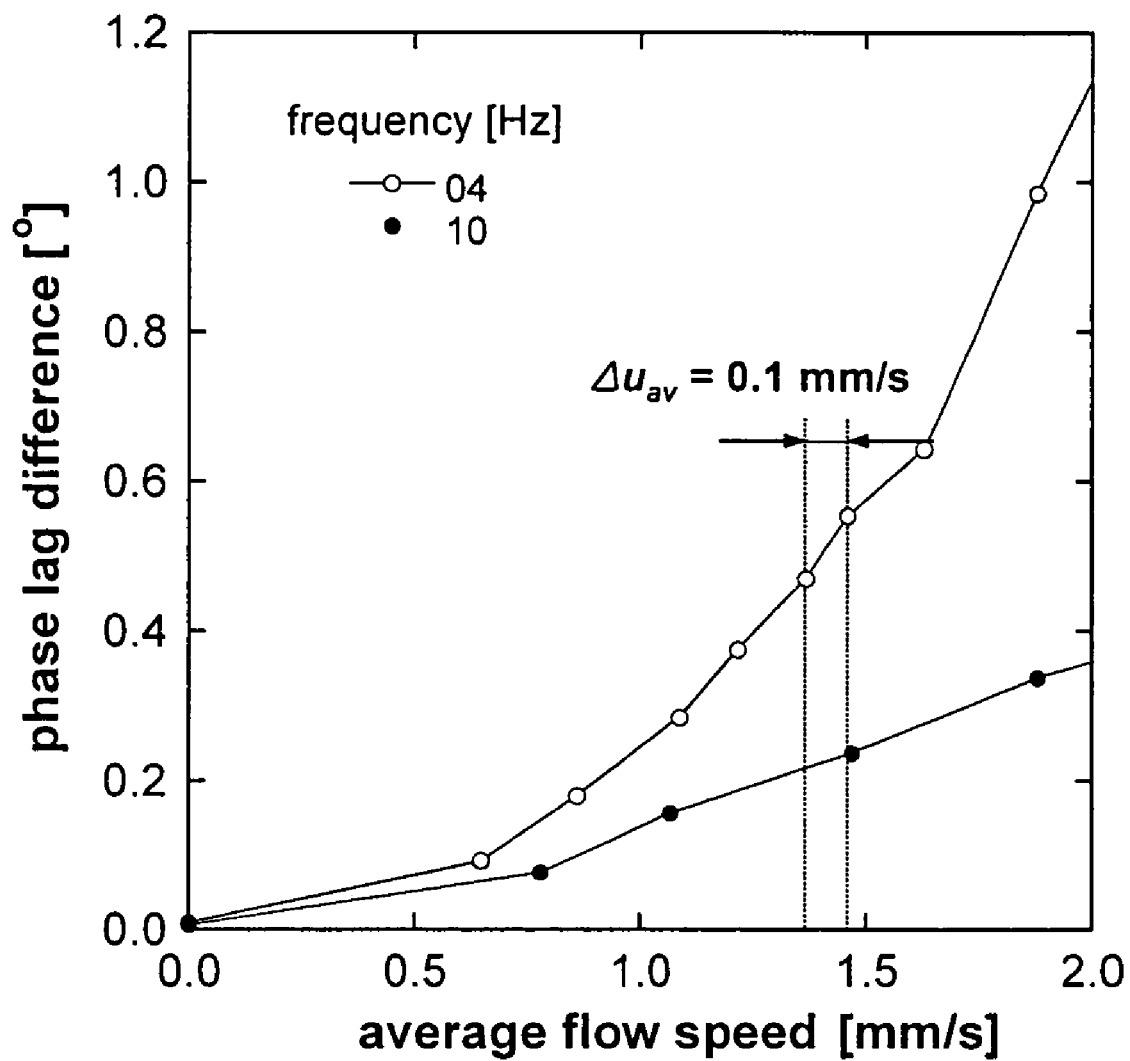
FIG. 8B is an enlarged graph showing a part B of FIG. 8A.

FIG. 8B is an enlarged graph showing a part "B" of FIG. 8A, that is, an average flow speed range of 0.0 to 2.0 mm/s.

Referring to FIG. 8B, it can be seen that the average flow speed change of 0.1 mm/s induces phase lag change of about 0.1° in the average flow speed range from 1.4 to 1.5 mm/s. Since a commercialized lock-in amplifier has the phase measurement accuracy of about 0.001°, the flowmeter applying the present invention can measure flow speed with the resolution of several μm/s.

The phase lag-flow rate mapping data shown in FIG. 8A is stored in the memory 154 within the flowmeter 100 of the present invention to be utilized for measuring flow rates. The sets of data stored in the memory 154 can be classified according to the types of fluid, supplied AC power frequencies and etc. The microprocessor 152 receives a frequency of supplied AC power from the signal processing unit 140 or the AC power supply 110, and a measured phase lag value from the signal processing unit 140, searches the stored data for a flow rate corresponding to the measured phase lag value, and outputs the searched flow rate. Further, the microprocessor 152 can control the frequency of the supplied AC power 110 if it is determined that the phase lag can be more accurately measured at another frequency with reference to stored data. The intervals at which data are stored in the memory 154 can be determined in consideration of the measurement accuracy of the signal processing unit 140. Properly, the microprocessor 150 may calculate the flow rate using a suitable mathematical algorithm, such as an interpolation, on the basis of the stored data.

As described above, the present invention provides an AC type flowmeter and a method of mapping flow rate data for the flowmeter, which have the following advantages. First, since the present invention measures only the phase lag at a heating frequency, all the noises with different frequencies from surroundings can be actively eliminated. Therefore, a sensor is not susceptible to environmental temperature variations unless the temperature change of the surroundings is so large that it influences the material properties of a fluid and eventually changes the characteristics of the flow field.

Second, since the present invention measures a flow rate in a frequency domain, measurement accuracy does not depend on the temperature or heat generation of a sensor. Therefore, the present invention can measure a flow rate using only minimum heating power capable of generating a signal required for phase measurement, reduces energy consumption required to operate the sensor, and minimizes the heating of a surrounding fluid.

Third, due to the development of digital signal processing technology, the phase lag can be measured with extreme accuracy, so that even very slow flow can be accurately measured with high precision.

Moreover, the present invention can easily measure a flow rate over a wide range by changing the frequency of supplied AC power, and measure a flow rate by inserting only a fine resistive heater into a fluid, so that the flowmeter can be easily applied to a microfabrication system because of its simplified structure.

Due to the above advantages, the AC type flow rate measuring scheme of the present invention is appropriate for flow rate measurement in a flow field with temperature variations, or the precise measurement of a flow rate in a microfluidic system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A flowmeter, comprising:
   a resistive heater to be inserted into a fluid;
   Alternating Current (AC) power with a frequency ω to periodically heat the resistive heater;
   a signal processing unit having electrical contact at both ends of the resistive heater for receiving signals generated in the resistive heater and for detecting a 3ω voltage signal generated in relation to a temperature variation of the resistive heater by the AC power among the received signals, and obtaining a phase lag of the 3ω voltage signal relative to the heat generation in the resistive heater; and
   an operation unit for calculating a flow rate of the fluid based on the obtained phase lag.

2. The flowmeter according to claim 1, further comprising a first detecting unit for detecting a voltage signal from the resistive heater, wherein the signal processing unit detects the first signal from an output signal of the first detecting unit.

3. The flowmeter according to claim 2, further comprising:
   a variable resistor placed on a supply path of the AC power and set for the same resistance value as that of the resistive heater; and
   a second detecting unit for detecting a voltage signal from the variable resistor;
   wherein the signal processing unit detects the first signal based on a signal obtained by subtracting an output signal based on a signal obtained by subtracting an output signal of the second detecting unit from the output signal of the first detecting unit.

4. The flowmeter according to claim 1, wherein the resistive heater is a metallic or semiconductor material.

5. The flowmeter according to claim 1, wherein the operation unit comprises:

a memory unit for storing phase lag data between the first signal and the heat generation in the resistive heater and flow rate data corresponding to the phase lag data, which are mapped to each other; and a microprocessor for calculating the flow rate of the fluid based on a correspondence between the obtained phase lag data of the first signal and the data stored in the memory unit.

6. The flowmeter according to claim 5, wherein the microprocessor controls the frequency of the AC power.

7. The flowmeter according to claim 1, wherein the signal processing unit comprises a lock-in amplifier.

8. A method of mapping phase lags to flow rates, comprising the steps of:

a) providing a resistive heater in fluid moving at a predetermined flow rate;

b) supplying AC power with a frequency $\omega$ to the resistive heater;

c) receiving signals generated in the resistive heater via electrical contact at both ends of the resistive heater and detecting a $3\omega$ voltage signal which is related to a temperature variation of the resistive heater among the received signals;

d) obtaining a phase lag of the $3\omega$ voltage signal relative to the heat generation in the resistive heater;

e) measuring the flow rate of the fluid;

f) repeating the steps b) to e) while varying the flow rate of the fluid; and g) mapping measured flow rates of the fluid to phase lags of the $3\omega$ voltage signal.

9. The mapping method according to claim 8, further comprising a step of repeating the steps b) to f) while varying the frequency $\omega$.

* * * * *